United States Patent
Landry et al.

(10) Patent No.: US 7,793,124 B2
(45) Date of Patent: Sep. 7, 2010

(54) SYSTEM AND METHOD OF CLASSIFICATION IN POWER OVER ETHERNET SYSTEMS

(75) Inventors: D. Matthew Landry, Austin, TX (US); Russell J. Apfel, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 262 days.

(21) Appl. No.: 11/967,808

(22) Filed: Dec. 31, 2007

(65) Prior Publication Data
US 2008/0162973 A1    Jul. 3, 2008

Related U.S. Application Data

(63) Continuation of application No. 11/473,209, filed on Jun. 22, 2006.

(51) Int. Cl.
*G06F 1/26* (2006.01)
(52) U.S. Cl. .................. 713/300; 713/322; 713/323; 713/330; 725/130; 725/150
(58) Field of Classification Search .............. 713/300; 725/130, 150
See application file for complete search history.

(56) References Cited

U.S. PATENT DOCUMENTS

| | | | |
|---|---|---|---|
| 6,841,979 B2* | 1/2005 | Berson et al. | 323/282 |
| 7,248,097 B2* | 7/2007 | Montgomery | 327/538 |
| 7,593,756 B2* | 9/2009 | Ferentz et al. | 455/572 |
| 2006/0092000 A1* | 5/2006 | Karam et al. | 340/310.11 |
| 2006/0212724 A1* | 9/2006 | Dwelley et al. | 713/300 |
| 2007/0103829 A1* | 5/2007 | Darshan et al. | 361/90 |
| 2007/0257780 A1* | 11/2007 | Schindler | 340/310.11 |

* cited by examiner

*Primary Examiner*—Nitin C Patel
(74) *Attorney, Agent, or Firm*—Polansky & Associates, P.L.L.C.; R. Michael Reed

(57) ABSTRACT

A power sourcing equipment (PSE) device is disclosed that includes an interface adapted to communicate with a powered device via wire pairs of a cable, a power supply circuit adapted to provide power to the interface, and device detection logic to detect the powered device coupled to the interface. The PSE device further includes power classification logic coupled to the interface and adapted to provide a power classification signal to the powered device. The power classification signal includes a first power classification signal and a second power classification signal to identify a power classification associated with the powered device. The power classification logic monitors the interface to detect a device classification response from the powered device and determines the power classification associated with the powered device based on the device classification response.

22 Claims, 5 Drawing Sheets

SYSTEM AND METHOD OF CLASSIFICATION IN POWER OVER ETHERNET SYSTEMS

CROSS REFERENCE TO RELATED APPLICATION(S)

This application is a Continuation Patent Application of and claims priority from U.S. patent application Ser. No. 11/473,209, entitled "SYSTEM AND METHOD OF CLASSIFICATION IN POWER OVER ETHERNET SYSTEMS," filed on Jun. 22, 2006, which is incorporated herein by reference in its entirety.

FIELD OF THE DISCLOSURE

The present disclosure is generally related to systems and methods of classification of powered devices in Power over Ethernet networks.

BACKGROUND

Power over Ethernet (PoE), which is outlined in IEEE Std 802.3™-2005 clause 33 (the PoE standard), refers to a technique for delivering power and data to an electronic device via Ethernet cabling. In a PoE system, power sourcing equipment (PSE) provides a power supply to electronic devices, which may be referred to as powered devices, via an Ethernet cable. PoE eliminates the need for a separate power source to deliver power to attached powered devices. Such powered devices may include voice over Internet protocol (VoIP) telephones, wireless routers, security devices, field devices to monitor process control parameters, data processors, and the like.

The PoE standard specifies that a PSE perform a powered device detection operation to determine whether the powered device is attached before supplying power via the Ethernet cable. To perform detection, the PSE provides a DC voltage (within a range of 2.8 to 10 Volts DC) on pairs of wires of the Ethernet cable and monitors a received current (Amps) or a received voltage (V) to detect a resistance within an expected range (e.g. between 19 and 26.5 K-ohms). The PSE determines the powered device's presence using a Volt-Amp (VA) slope related to the powered device's voltage/current signature. If the PSE does not detect a valid resistance, the PSE does not apply power to the Ethernet port assigned to the powered device.

Once a powered device has been detected, the PoE standard specifies that the PSE may optionally perform a power classification operation to determine power requirements of the detected powered device. The PoE standard specifies five device classes, classes 0-4, which define expected power consumption levels of powered devices. If the PSE supports power classification, the PSE applies a classification voltage (DC) to the Ethernet port associated with the detected powered device. Assuming that the powered device supports classification, the powered device applies a resistive load to attenuate the DC voltage, current, or any combination thereof, to produce a current signature for the device. The PSE determines the powered device's power classification based on this current signature.

For example, a powered device may draw a current to specify its classification. A current draw of zero to four mA corresponds to class 0, which is also the default class for devices that do not support classification. A current draw of 26 to 30 mA and of 36 to 44 mA corresponds to class 3 and class 4 devices, respectively. The PoE standard specifies that the PSE provide a power supply of approximately 15.4 watts to devices of class 0, class 3 and class 4. A current draw of between 9 and 12 mA corresponds to a class 1 device, and the PoE standard specifies that the PSE provide a power supply of up to approximately 4 watts to a class 1 device. A class 2 device corresponds to a current draw of 17 to 20 mA and requires the PSE to provide approximately 7 watts of power.

The PSE may use the powered device power classification to manage power allocation with respect to an overall power budget of the PSE. If a power level associated with the power classification of the powered device exceeds the available budget, the PSE need not apply power to the associated Ethernet port. If the power desired is within the power budget, the PSE may apply power to the associated Ethernet port. By utilizing power classification, a PSE may more accurately determine an associated power demand and may be able to support a larger number of powered devices than if the PSE reserved a maximum power consumption for each powered device.

Many powered devices do not continuously utilize the power level specified by the power classification. For example, between calls, a VoIP telephone may utilize much less than its maximum power level. Additionally, powered devices may fall between power classification levels, and a power budget of a PSE may be underutilized because the power classifications are imprecise relative to the power needs of attached powered devices.

Some PSEs may utilize a statistical algorithm to estimate power consumption for attached devices and may base its power allocation decision-making on such an estimate. However, such estimates rely on the maximum power specified by the device power classification, and the powered device may reserve more power than is necessary. Therefore, there is a need for enhanced classification of powered electronic devices.

SUMMARY

In a particular embodiment, a network device is disclosed that includes an interface adapted to communicate with to a node of a network and logic coupled to the interface. The logic transmits at least two classification signals to the node and to identify a power classification associated with the node based on a response.

In another particular embodiment, a method is disclosed that includes applying a classification voltage signal including at least two distinct signal elements to a node of a network and receiving a power classification signal at the node in response to applying the classification voltage signal. The method also includes applying a power supply voltage to the node based on the power classification signal.

In still another particular embodiment, a method is disclosed that includes receiving a classification voltage including at least two distinct signal elements at a powered device. The method also includes drawing a classification current indicating a power classification associated with the powered device in response to receiving each of the at least two distinct signal elements. The method also includes receiving a power supply from the powered network according to the power classification.

DETAILED DESCRIPTION OF THE DRAWINGS

Figure 1:
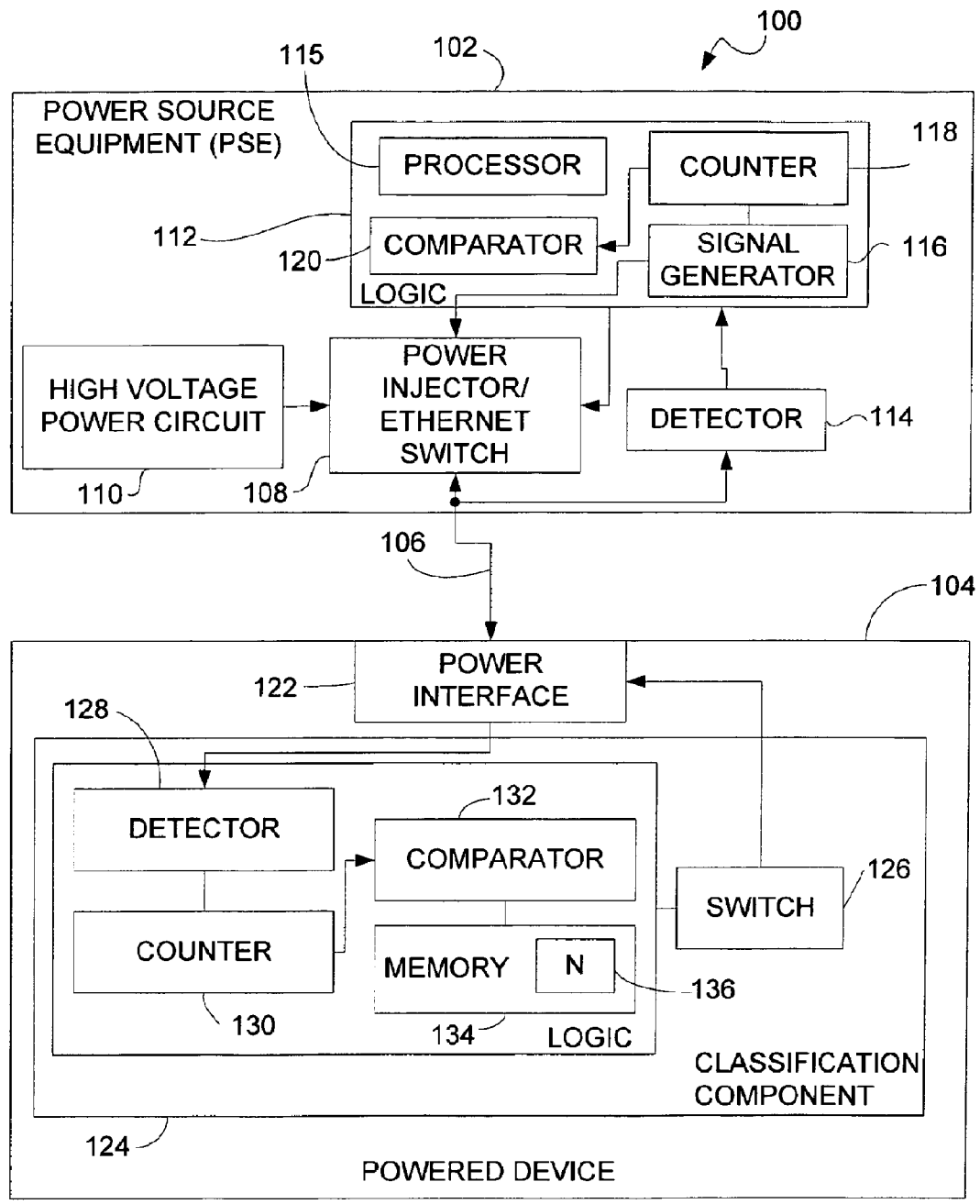
FIG. 1 is a block diagram of a particular embodiment of a Power over Ethernet (PoE) system with enhanced classification functionality.

FIG. 1 is a block diagram of a particular embodiment of a Power over Ethernet (PoE) system 100 with enhanced classification functionality. The system 100 includes power sourcing equipment (PSE) 102 and a powered device 104 communicatively coupled by an Ethernet cable 106. The PSE 102 may include a power injector/Ethernet switch 108, a high voltage power circuit 110, logic 112, and a detector 114. The logic 112 may include a signal generator 116, a counter 118, and a comparator 120. The high voltage power circuit 110 is connected to the power injector/Ethernet switch 108, which is connected to the Ethernet cable 106. The high voltage power circuit 110 provides a power supply to the power injector/Ethernet switch 108, which provides a power supply to the powered device 104 via the Ethernet cable 106. The logic 112 is connected to the power injector/Ethernet switch 108. The detector 114 is coupled to the Ethernet cable 106 and to the logic 112. The counter 118 is connected to the signal generator 116 and to the comparator 120. In one particular embodiment, the logic 112 may include a processor 115. It should be understood that the Ethernet switch is an optional component of the PSE 102 and power injector 108. If the PSE takes the form of a midspan power injector, the PSE injects power onto the Ethernet cable, which carries data that is provided from an external Ethernet switch.

The powered device 104 includes a power interface 122 and a classification component 124. The classification component 124 may include a switch 126, a detector 128, a counter 130, a comparator 132, and a memory 134. The power interface 122 is connected to the Ethernet cable 106 and to the detector 128 of the classification component 124. The memory 134 may be a non-volatile memory, such as a read only memory (ROM), a programmable read only memory (PROM), and the like, which may be utilized to store one or more threshold values (N) 136, or other data. In a particular embodiment, the power interface 122 may include one or more diode bridges, an over voltage protection circuit, and other voltage and current regulation components. Additionally, the classification component 124 may include pins to interface with an external resistor, for example. In another particular embodiment, the power interface 122 and the classification component 124 may be fabricated on a single substrate.

In operation, the PSE 102 performs a detection process to detect a powered device 104 attached to the Ethernet cable 106 and associated with a node of the Power Injector/Ethernet switch 108. In response to the detection process, the powered device 104 applies a resistance within a predetermined range (e.g. approximately 25 K-ohms for the PoE standard), which provides an expected response for the PSE 102 to detect the presence of the powered device 104.

Once the PSE 102 detects the powered device 104, the PSE 102 may perform a classification process to determine the power requirements of the powered device by applying a classification voltage to the node, which transfers the classification voltage to the powered device 104 via the Ethernet cable 106. In one particular embodiment, the PSE 102 provides a stable classification voltage for an initial period. The stable classification voltage may be less than an operating voltage of the powered device 104. The powered device 104 responds to the classification voltage by drawing a current according to a particular Power over Ethernet classification, such as class 0, class 1, class 2, or class 3. After a period of time, the logic 112 generates a sequence of distinct signal elements using the signal generator 116 and superimposes the sequence of distinct signal elements onto the classification voltage. The counter 118 is coupled to the signal generator 116 to detect and count each signal element transmitted to the powered device 104.

The powered device 104 receives the classification voltage at the power interface 122, which provides the classification voltage to the detector 128 of the classification component 124. The classification voltage includes a baseline voltage level that is below an operating voltage range of the powered device 104 (e.g. below 36 volts DC, for example) and a sequence of distinct signal elements that may be derived from the classification voltage. The detector 128 detects each signal element of the sequence of distinct signal elements. The classification component 124 draws a classification current (Iclass) after receiving the classification voltage via the Ethernet cable 106 until the detected number of signal elements exceeds a predetermined number. The counter 130 maintains a count of each signal element. The comparator 132 compares the count to a predetermined number (N) 136 from the memory 134. If the count matches the predetermined number (N) 136, the logic 138 adjusts the switch 126 to alter the current. In one particular embodiment, the switch 126 shuts off the current that is drawn via the Ethernet cable 106. In another particular current, the switch 126 is adjusted to reduce or increase a level of the current (e.g. to throttle the current).

Each power classification may be subdivided into multiple power levels. A particular power level within a power classification may be selected by counting up or counting down from a baseline power level of the particular power classification based on a count of the distinct signal elements. For example, the PSE 102 may transmit a periodic signal (such as a sinusoidal signal, a periodic step voltage, and the like) by superimposing the periodic signal onto the classification voltage, and the falling edges or rising edges of the signal may represent periodic and distinct signal elements, each of which may correspond to an incremental change from the baseline power level.

The detector 114 monitors a current drawn by the powered device 104 to detect a change in the current level and provides an indication to the logic 112 in response to detection of the change in the current level. The logic 112 then determines a power classification related to the powered device 104 based on the timing of the change in current relative to a number of distinct signal elements that have been transmitted to the powered device 104 prior to the change in current. In one embodiment, the comparator 120 compares the count of the number of distinct signal elements to a table of values to determine a power classification and an associated power level. Table 1 below provides an illustrative example of a set of PoE classifications for enhanced power classification (sometimes referred to as PoE-Plus), including a classification current drawn to select a particular classification and a power level associated with each power classification.

TABLE 1

| Class | Classification Current (mA) | Power level low (watts) | Power Level high (watts) |
|---|---|---|---|
| 0 | 2 to 4 | 27.95 | 55.95 |
| 1 | 9 to 12 | 3.84 | 6.49 |
| 2 | 17 to 20 | 6.49 | 12.95 |
| 3 | 26 to 30 | 12.95 | 27.95 |
| 4 | 36 to 44 | reserved | reserved |

Table 2 below provides a representative example of a particular embodiment of a set of fifteen sub-classifications (0-14) within class 1, for example, which illustrate power levels at each sub-classification corresponding to a number of signal elements.

TABLE 2

| Classification/sub-class | Number of Distinct Signal Elements (0.177 watt increments) | Power level |
|---|---|---|
| class 1.0 | 0 or more than 15 | 6.49 watts |
| class 1.1 | 1 | 6.313 watts |
| class 1.2 | 2 | 6.136 watts |
| class 1.3 | 3 | 5.959 watts |
| class 1.4 | 4 | 5.782 watts |
| class 1.5 | 5 | 5.605 watts |
| class 1.6 | 6 | 5.428 watts |
| class 1.7 | 7 | 5.251 watts |
| class 1.8 | 8 | 5.074 watts |
| class 1.9 | 9 | 4.897 watts |
| class 1.10 | 10 | 4.720 watts |
| class 1.11 | 11 | 4.543 watts |
| class 1.12 | 12 | 4.366 watts |
| class 1.13 | 13 | 4.189 watts |
| class 1.14 | 14 | 4.012 watts |
| class 1.15 | 15 | 3.840 watts |

In general, it should be understood that the values provided in the above-tables are illustrative only. Other values for the power classifications may be utilized, depending on the particular application. Moreover, while Table 2 illustrates 15 power increments, any number of power increments may be utilized to achieve a desired level of granularity with respect to power level selection for the powered device 104. Finally, in the illustrative example of Table 2, the power increment is 0.177 watts. However, other power increments may be utilized in other classes or within class 1, depending on the particular implementation. For example, the class 0 may be divided into fifteen power levels, each of which represents a decrement of approximately 2 watts, except the last step, which is approximately 15 watts (corresponding to the fifteenth signal element). Thus, a power increment may vary within a class or between classes in a given implementation.

The logic 112 uses the power classification determination results and controls the power injector/Ethernet switch 108 to provide a power supply having a power level determined according to the power level requirement of the powered device 104 based on the power classification. In another embodiment, the processor 115 may calculate a power requirement of the powered device 104 by subtracting a number of power increments from the baseline power level. For example, the powered device power requirement may equal the baseline power level minus the product of the number of signal elements times the power increment. For example, in one particular embodiment, the power increment may be approximately 0.25 watts, and the equation is as follows:

Power level=(baseline power)−((number of signal elements)*(0.25 watts)).

The logic 112 of the PSE 102 may utilize the power classification to manage a power budget of the PSE 102 based on the power requirements of the powered device 104 and of other powered devices that may be coupled to the PSE 102. If the power budget has insufficient power to provide a power supply to the powered device 104 according to the determined power classification, the PSE 102 may not provide power to the Ethernet node coupled to the Ethernet cable 106 to the powered device 104.

In one embodiment, each power classification may be subdivided into multiple power levels, which may be selected by the powered device 104 by counting each distinct signal element and by turning off the current flow across the Ethernet cable 106 when a predetermined number of distinct signal elements are detected. In one particular embodiment, for a maximum power level, the powered device 104 may simply remove the current on Ethernet cable 106 after detecting one or more signal elements. Alternatively, the powered device 104 may ignore the distinct signal elements and accept a default power level of the associated power classification. The PSE 102 may be adapted to determine that such early removal of the current on Ethernet cable 106 reflects a default power requirement according to a determined power classification.

In general, it should be understood that some conventional PoE powered devices may not be adapted to detect or respond to the sequence of distinct signal elements. Such devices may not support enhanced power classification. Accordingly, if the powered device 104 does not respond to the sequence of distinct signal elements, the PSE 102 may recognize that the powered device 104 does not support enhanced powered classification, and thus the PSE 102 provides a maximum power according to the determined power classification.

It should be understood that the power injector/Ethernet switch 108 may include a plurality of nodes to which multiple Ethernet cables may be attached. Powered devices may be attached to one or more of the Ethernet cables, and the PSE 102 may provide power and data to one or more of the powered devices at a power level determined by a classification process. Additionally, it should be understood that, while the PSE 102 and the powered device 104 are shown with a number of components, the components are provided for illustrative purposes. One or more of the functions may be performed by a single device. For example, in one particular embodiment, the comparator 120, the signal generator 116, and the counter 118 may represent functions that are performed by a processor, such as processor 115. Similarly, the logic 138 of the powered device 104 may include other circuit components and may perform other functions (not shown), which are unrelated to the classification operation. Furthermore, while PSE 102 must include power injector functionality, it need not include Ethernet switch functionality.

Figure 2:
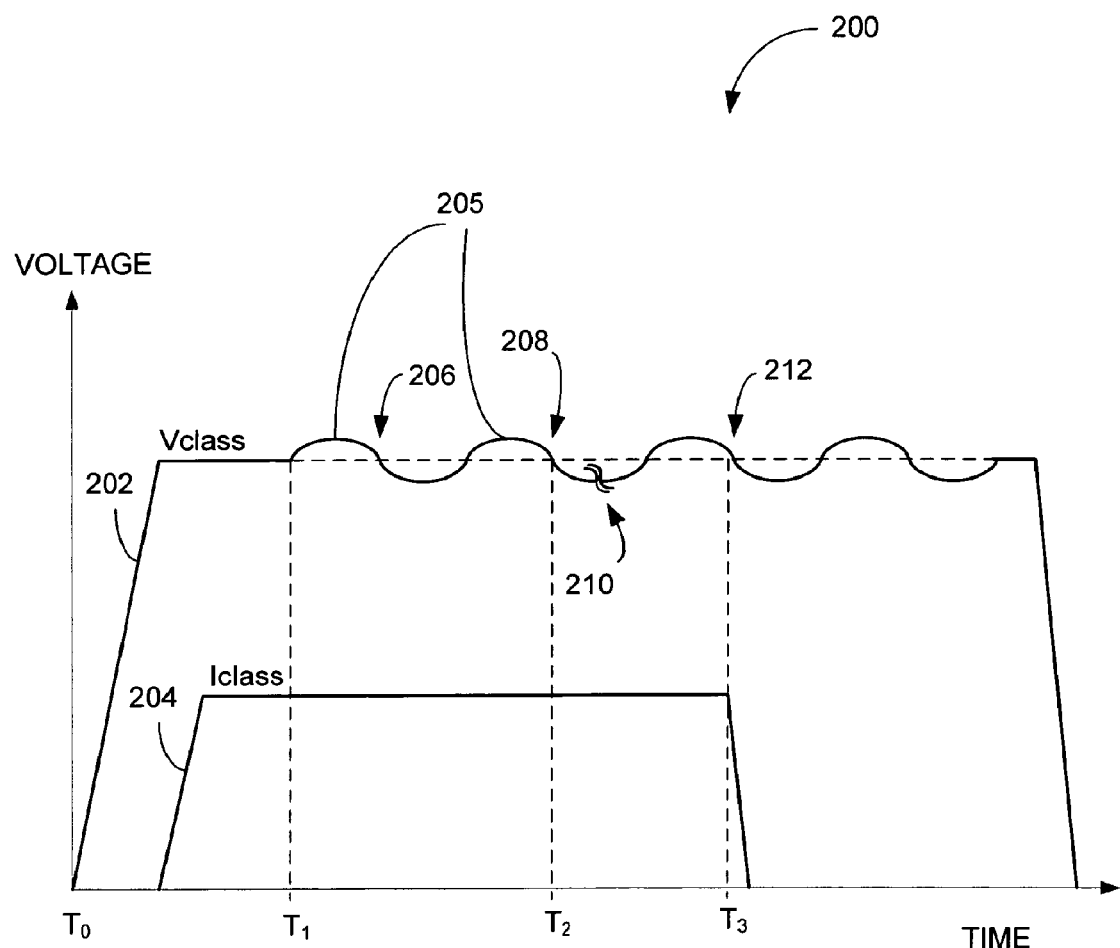
FIG. 2 is a graph illustrating an applied classification voltage and a classification current versus time according to a particular embodiment of a PoE system with enhanced classification functionality.

FIG. 2 is a graph 200 illustrating an applied classification voltage and a classification current versus time according to a particular embodiment of a PoE system with enhanced classification functionality. The graph 200 includes a voltage classification (Vclass) signal 202 (e.g. a 15 volt to 20 volt classification signal) and a current classification (Iclass) signal 204. The power sourcing equipment, such as PSE 102 in FIG. 1, applies the classification voltage 202 to a node of the network to which a powered device is attached. In response to the classification voltage, the powered device (such as the powered device 104 in FIG. 1) responds by drawing a classification current 204. The level of the classification current (Iclass) 204 identifies a classification of the powered device according to the PoE standard, which corresponds to a baseline power requirement associated with the particular classification. From time $T_0$ to $T_1$, the classification voltage 202 does not include detectable signal elements. At time $T_1$, the PSE provides a sequence of distinct signal elements derived from the classification voltage signal 202, such as peaks 205. At 206, the powered device may detect a distinct signal element on the classification voltage 202. At 208, the powered device may recognize that the power sourcing equipment includes enhanced power classification functionality. Between T1 and T2, any number of signal elements may be provided to indicate to the powered device the presence of an enhanced classification functional PSE. Using multiple signal elements as an initial indicator of enhanced classification functionality increases the robustness of the particular embodiment. After time $T_2$, the powered device begins counting the distinct signal elements. Depending on the particular implementation, a number (N) of distinct signal elements may be provided, as indicated at 210. At time $T_3$, the powered device has counted a number of distinct signal elements that matches a predetermined number, and at 212, the powered device alters the classification current 204.

The change in the classification current 204 is detectable via the node connected to the Ethernet cable at the power sourcing equipment. The logic of the power sourcing equipment may determine a power classification of the powered device based on timing of the change in the classification current 204 relative to a number of distinct signal elements that have been transmitted to the powered device prior to the change in current.

In general, the number of sub-classifications within a particular power classification determines the granularity with which the various power levels may be selected. Each signal element of the sequence of distinct signal elements corresponds to a sub-classification within the particular power classification. For example, in one particular embodiment, if the power classification is subdivided into 15 power levels, fifteen distinct signal elements may be transmitted, allowing the powered device to select one of the 15 power levels. In another particular embodiment, if the power classification is subdivided into 70 power levels, then 70 distinct signal elements may be transmitted to allow the powered device to select one of the seventy power levels. As a frequency of the distinct signal elements is increased, the granularity may also increase. However, the frequency may be limited by a transmission time of the distinct signal elements and by safety specifications.

Figure 3:
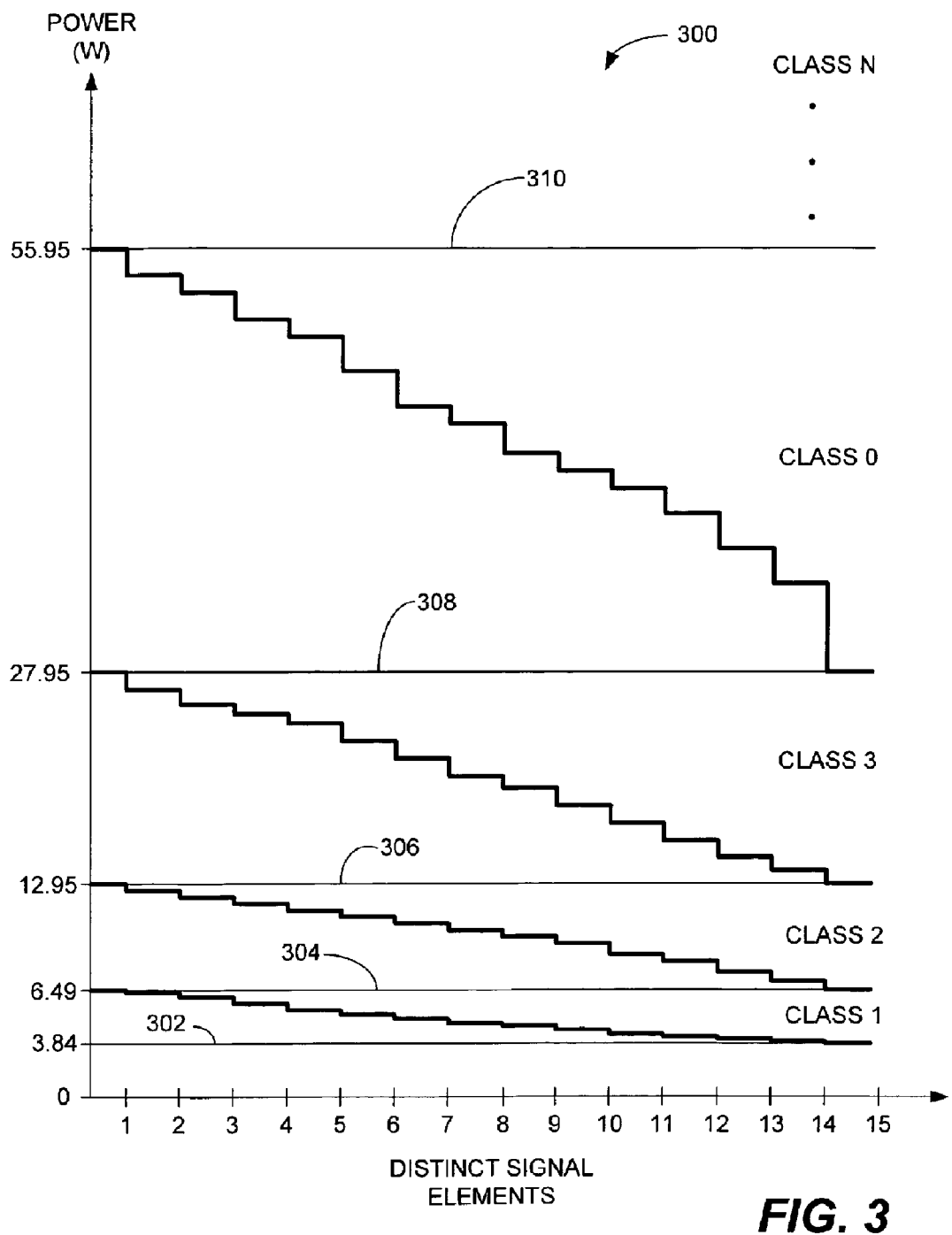
FIG. 3 is a graph illustrating selectable power levels within illustrative power consumption classifications.

FIG. 3 is a graph 300 illustrating selectable power levels within illustrative power consumption classifications. For example, the power classifications may be defined with a baseline power level within which a particular powered device prefers to operate. In this illustrative example, a class 1 powered device may operate in a power range of approximately 3.84 watts to 6.49 watts as indicated by lines 302 and 304. A class 2 powered device may operate in a range of approximately 6.49 watts at line 304 to 12.95 watts at line 306. A class 3 powered device may operate in a range of approximately 12.95 watts at line 306 to 27.95 watts at line 308. A class 0 powered device may operate in a power range of 27.95 watts at line 308 to 55.95 watts at line 310. Other classifications may exist above 55.95 watts, depending on the particular implementation. Additionally, classes 0-3 are illustrative examples only, and may be subdivided into other power classifications having different power ranges for particular implementations.

It should be understood that the particular power classifications, which are identified above, may be associated with a standard, such as the PoE standard. In some instances, the power classifications may have different power ranges, may be associated with other types of powered networks, or any combination thereof.

In one particular embodiment, within class 1, the power requirement may be subdivided, for example, into fifteen different power levels ranging from 6.49 watts at 304 to 3.84 watts at 302, where each power level represents a decrement or increment of approximately 0.177 watts. Similarly, each of the classifications (classes 1-N) may be subdivided into fifteen different power levels.

During a classification process, a powered device may draw a classification current in response to receiving a classification voltage. The classification current may identify a particular class and a particular power baseline requirement. For example, a powered device that provides a baseline current identifying class 1 specifies a baseline or default power requirement of approximately 6.49 watts. After identifying the PSE as a PSE with enhanced power functionality, the powered device may turn off the classification current drawn from the Ethernet cable or alter the current draw after counting a particular number of distinct signal elements in order to more precisely identify the powered device's power requirements relative to the baseline power requirement associated with a particular classification. For example, in one particular embodiment, class 1 may be subdivided into 15 different power levels from 6.49 watts to 3.84 watts in 0.177 watt decrements (as shown in Table 2 above), and after detecting four signal elements, the powered device may shut off the current drawn from the Ethernet cable. By turning off the current after four signal elements, the powered devices identifies a power requirement that is approximately four 0.177 watt decrements below the baseline power level of 6.49 watts for the class 1 power classification (e.g. 5.782 watts). Alternatively, each signal element may represent an incremental increase from the baseline power level, such that shutting off the current after four signal elements specifies a power requirement of 7.198 watts.

It should be understood that while fifteen different subdivisions are shown within each class, any number of subdivisions may be provided within any given class, depending on the particular implementation. Additionally, it should be understood that the particular subdivisions may be equal steps or increments within a range of values, or may vary, depending on the particular implementation. Finally, while the particular example shown in FIG. 3 represents an incremental decrease with each count of a distinct signal element, the enhanced power functionality may also be utilized by counting up from a baseline power level.

Figure 4:
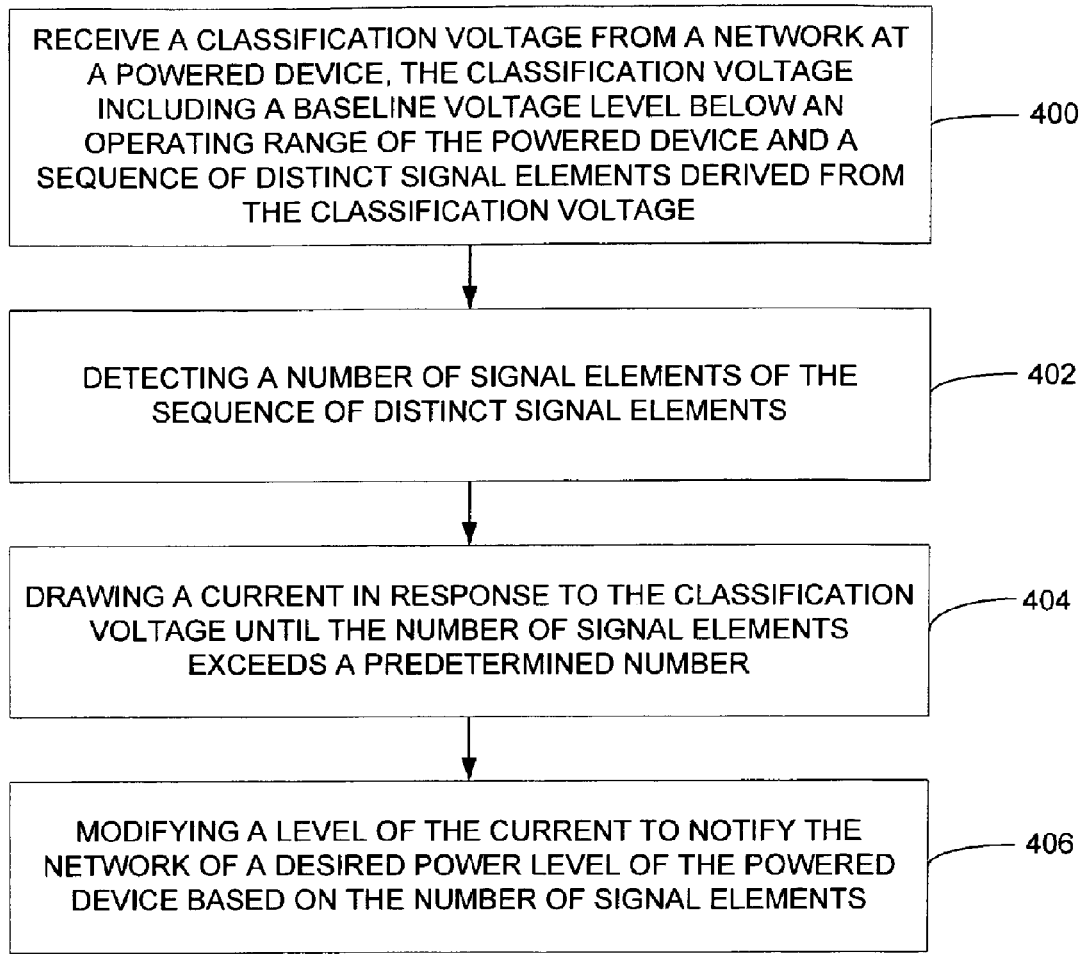
FIG. 4 is a flow chart of an embodiment of a method of selecting a power classification at a powered device.

FIG. 4 is a flow chart of a particular embodiment of a method of selecting a power classification at a powered device. A classification voltage from a network is received at a powered device. The classification voltage includes a baseline voltage level below an operating voltage range of the powered device and includes a sequence of distinct signal elements derived from the classification voltage (block 400). A number of signal elements of the sequence of these distinct signal elements is detected (block 402). A current is drawn in response to the classification voltage until the number of signal elements exceeds a predetermined number (block 404). The current is altered by the powered device to notify the network of the desired power level of the powered device based on the number of signal elements (block 406). In general, in one particular embodiment, the powered device may alter the current by changing a current level that is drawn by the powered device (either increasing or decreasing the current level). In a particular embodiment, the powered device stops drawing current from the Ethernet cable or may shut off the current.

Figure 5:
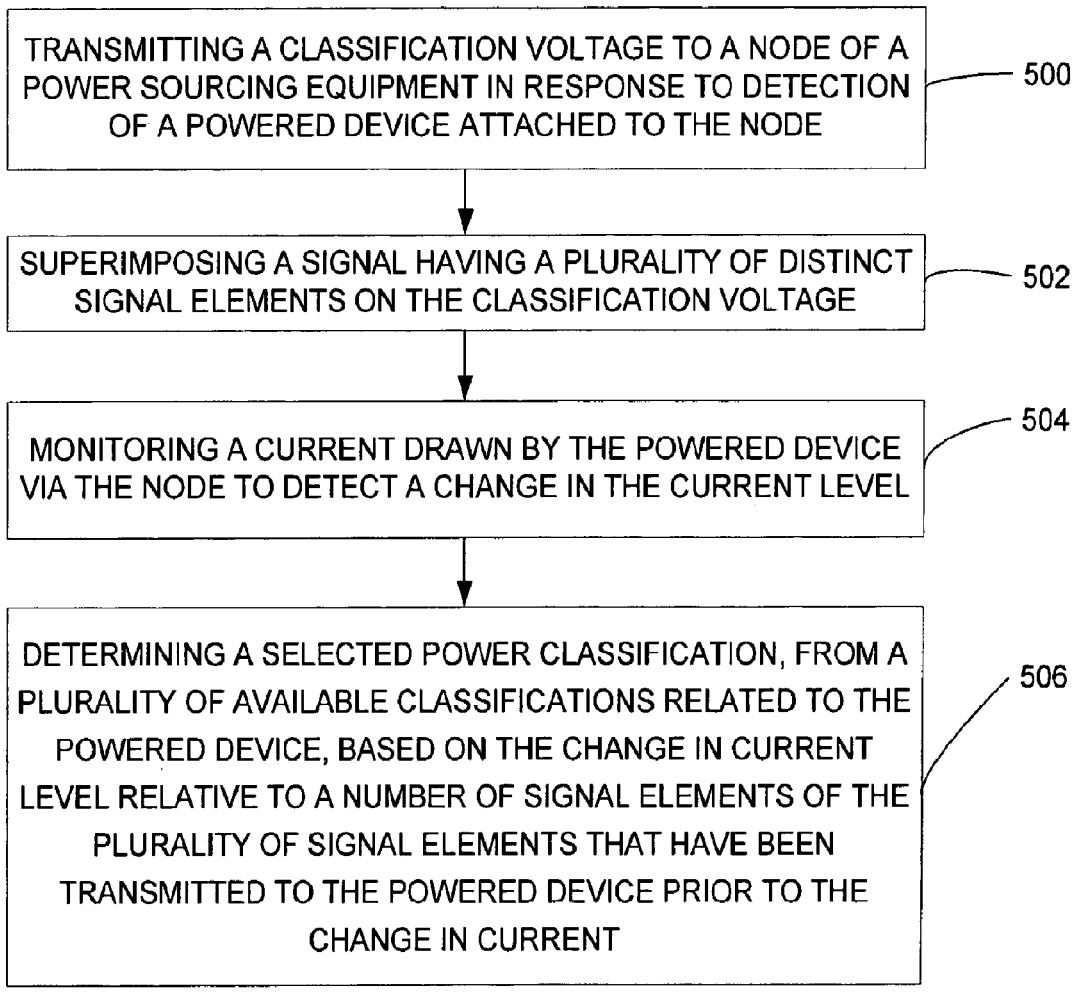
FIG. 5 is a flow chart of an embodiment of a method of determining a power classification of a powered device by power sourcing equipment.

FIG. 5 is a flow chart of a particular embodiment of a method of determining a power classification of a powered device by power sourcing equipment. A classification voltage is transmitted to a network node of a PSE in response to detection of a powered device passed to the network node (block 500). A signal having a plurality of distinct signal elements is superimposed on the classification voltage (block 502). A current drawn by the powered device is monitored via the network node to detect a change in the current level (block 504). A selected power classification is determined, from a plurality of classifications related to the powered device, based on the change in current level relative to a number of signal elements of the classification voltage that have been transmitted to the powered device.

The above-described embodiments of the systems and methods allow for enhanced power classifications within an existing power classification, which allows for powered devices that support the enhanced classification techniques without excluding devices that do not support such enhanced power classifications. Additionally, by utilizing a signal including a sequence of distinct signal elements that is superimposed on the classification voltage, the powered device and the power sourcing equipment do not need to be synchronized. Accordingly, the powered device does not need to include a clock or oscillator to provide a notion of time to the powered device that is independent from the PSE. The powered device may recover timing information from the signal generated by the PSE (e.g. from the signal including the sequence of distinct signal elements that is superimposed on the classification voltage). Thus, the powered device may be implemented without an independent clock, which reduces costs. Additionally, clock skew, frequency skew, and other timing related issues between the powered device and the PSE do not create a significant source of error. Since a clock is not required, the sequence of distinct signal elements may be transmitted to the powered device asynchronously, and the powered device may recover the signal elements from the classification voltage.

The superimposition of the sequence of distinct signal elements on the voltage classification signal may have a frequency that is below 400 Hz (with a margin of plus or minus 20 Hz) to meet electromagnetic interference and data coherence specifications. Additionally, the amplitude of the signal including the distinct signal elements may be lower than 2.15 Volts per peak (with a margin of error of approximately 0.15 volts) to remain within the classification voltage parameters specified by the PoE standard.

In general, while the signal including the distinct signal elements is shown as a substantially sinusoidal signal in FIG. 2, for example, it should be understood that the signal including the sequence of distinct signal elements may be provided as a periodic sinusoidal signal, a periodic trapezoidal signal, a periodic step, and the like. Alternatively, the distinct signal elements may be represented by the classification voltage aperiodically. In another embodiment, the distinct signal elements may be recovered from the classification voltage using more advanced modulation/demodulation techniques, such as a quadrature amplitude modulation (QAM), Phase Shift Keying (PSK), Frequency Shift Keying (FSK), other demodulation techniques, or any combination thereof.

In QAM, an amplitude and a phase of a signal is used to represent data. Accordingly, variations in amplitude and phase of the signal may represent distinct signal elements. In PSK, the distinct signal elements (such as bits) may be quantified by various phase changes by changing the phase of a transmitted waveform instead of the frequency. For example, if four angles of phase are used (0, 90, 180, and 270 degrees) then these four states can be translated into binary values (00, 01, 10, and 11, respectively), decimal values (0, 1, 2, and 3, respectively), or other values. In FSK, particular data values are represented by particular frequencies. For example, in one embodiment, a level change is indicated by a frequency shift between one of two frequencies. For example, one particular frequency may be used to represent a binary value of one, and a second particular frequency may be used to indicate a binary value of zero.

Although the present specification describes components and functions that may be implemented in particular embodiments with reference to particular standards and protocols, the invention is not limited to such standards and protocols. For example, the PoE standard represents an example of the state of the art. Such standards are periodically superseded by faster or more efficient alternatives having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power sourcing equipment (PSE) device comprising:
an interface to communicate with a powered device via wire pairs of a cable;
a power supply circuit to provide power to the interface;
device detection logic to detect the powered device coupled to the interface; and
power classification logic coupled to the interface, the power classification logic to provide a power classification signal to the powered device, the power classification signal including a plurality of distinct signal elements superimposed on a classification voltage pulse to identify a power classification associated with the powered device, the power classification logic to monitor the interface to detect first and second device classification responses from the powered device and to determine the power classification associated with the powered device based on the first and second device classification responses.

2. The PSE device of claim 1, wherein the power classification logic comprises a signal generator to produce the plurality of distinct signal elements.

3. The PSE device of claim 1, wherein the plurality of distinct signal elements are superimposed onto a classification voltage pulse to vary a voltage level of the classification voltage pulse during a classification process.

4. The PSE device of claim 1, wherein the power classification logic is determines a first power classification corresponding to a power level associated with the powered device when the powered device provides a first device classification response and determines a sub-class adjusted from the power level when the powered device provides a second device classification response.

5. The PSE device of claim 1, further comprising a detection circuit adapted to receive the first and second device classification responses, wherein each of the first and second device classification responses comprises at least one of a voltage level and a current level.

6. The PSE device of claim 1, further comprising power supply logic to provide a power supply to the powered device via the interface according to the power classification.

7. The PSE device of claim 1, wherein each of the plurality of distinct signal elements is entirely within a classification voltage range between approximately fifteen volts and approximately twenty volts.

8. A method comprising:
receiving a classification signal at a powered device from a powered network, the classification signal including at least two distinct signal elements superimposed on a classification voltage pulse;
selectively providing a first device classification response signal in response to receiving the classification signal and a second device classification response signal in response to the at least two distinct signal elements, the first and second device classification response signals to identify a power classification associated with the powered device; and
receiving a power supply from the powered network according to the identified power classification.

9. The method of claim 8, further comprising detecting the at least two distinct signal elements.

10. The method of claim 9, wherein selectively providing the device classification response signal comprises:
selectively providing a first device classification response signal in response to detecting a first one of the at least two distinct signal elements; and
selectively providing a second device classification response signal in response to detecting a second one of the at least two distinct signal elements.

11. The method of claim 9, wherein selectively providing the device classification response signal comprises turning off a current at the powered device after detecting one or more of the at least two distinct signal elements.

12. The method of claim 8, wherein the powered network comprises a Power over Ethernet (PoE) network and wherein the powered device comprises a PoE-enabled device.

13. The method of claim 8, wherein the at least two distinct signal elements include a change in a voltage level of the classification signal during a power classification detection process.

14. The method of claim 8, further comprising deriving an operating power supply from the received power supply.

15. A method comprising:
detecting a powered device coupled to a network port of a power sourcing equipment (PSE) device during a powered device detection process;
transmitting a power classification signal to the powered device via the network port in response to detecting the powered device, the power classification signal including a first portion and a second portion, the second portion including a plurality of distinct signal elements superimposed on a classification voltage pulse;
detecting a first power classification response from the powered device in response to the first portion;
detecting a second power classification response from the powered device in response to the second portion; and
determining a power classification associated with the powered device based on the first and second power classification responses.

16. The method of claim 15, further comprising providing a power supply to the powered device via the network port, the power supply including a power level corresponding to the power classification associated with the powered device.

17. The method of claim 15, wherein the first and second portions are below an operating voltage range of the powered device.

18. The method of claim 15, further comprising adjusting a power budget at the PSE device according to the power classification associated with the powered device.

19. The method of claim 18, further comprising:
comparing an expected power consumption level associated with the power classification to an available power budget; and
providing a power supply associated with the power classification to the powered device when the expected power consumption level is less than the available power budget.

20. The method of claim 15, further comprising:
generating the plurality of distinct signal elements; and
superimposing the plurality of distinct signal elements onto a classification voltage to produce the second portion.

21. The method of claim 15, wherein the first power classification response comprises a first current and wherein the second power classification response comprises a second current.

22. The method of claim 15, wherein transmitting the power classification signal comprises transmitting the power classification signal within a classification voltage range between approximately fifteen volts and approximately twenty volts;
wherein the first portion and each of the plurality of distinct signal elements of the second portion are entirely within the classification voltage range.

* * * * *